May 4, 1937.   H. W. BOUSMAN   2,079,485
PROTECTIVE ARRANGEMENT FOR ELECTRICAL INSTRUMENTS
Filed Oct. 23, 1934

Inventor:
Henry W. Bousman,
by Harry E. Dunham
His Attorney.

Patented May 4, 1937

2,079,485

UNITED STATES PATENT OFFICE 2,079,485

PROTECTIVE ARRANGEMENT FOR ELECTRICAL INSTRUMENTS

Henry W. Bousman, Scotia, N. Y., assignor to General Electric Company, a corporation of New York Application October 23, 1934, Serial No. 749,543

1 Claim. (Cl. 171—95)

My invention relates primarily to a scheme for protecting electrical devices such as measuring instruments, relays and the like, against excessive voltages, and it is a primary object of my invention to provide such protection yet without interfering with the operation of the instrument or relay which is protected when such excessive voltages occur. The invention is particularly suitable for use in connection with instruments used in null measurement schemes where high sensitivity is desired at very small detecting voltages and where it is desired that the sensitivity of the instrument shall decrease, but yet give an indication at higher voltages.

In carrying my invention into effect in its preferred form, I connect a storage battery or the equivalent and a rectifier in series relation in shunt to the instrument circuit to be protected. For voltages below that of the storage battery the shunt circuit has no effect since the rectifier is connected in such direction that the battery cannot discharge through the instrument circuit. Consequently until the applied voltage becomes sufficient to charge the battery, a current proportional to the first power of such voltage is applied to the instrument. However, as the voltage increases, the battery starts to charge and the current applied to the instrument no longer increases in a linear relation with the applied voltage.

The scheme is suitable with slight modification for either direct or alternating current systems.

Figure 1:
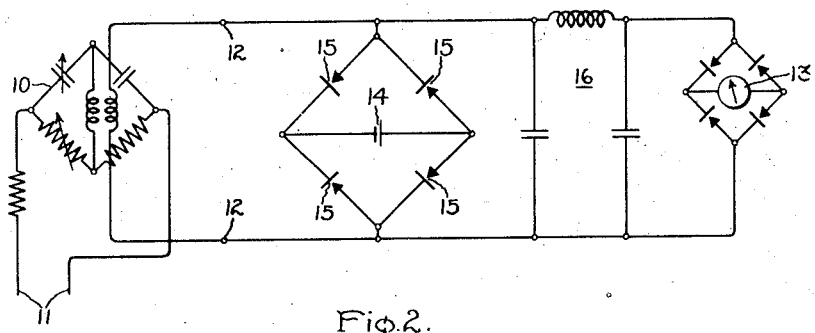
Figure 2:
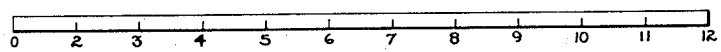
Figure 3:
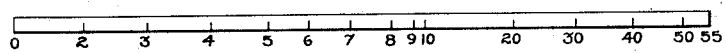
Figure 4:
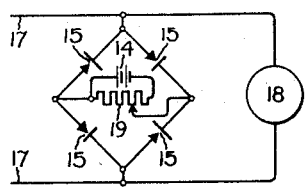
Figure 5:
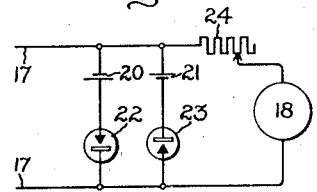
Figure 6:
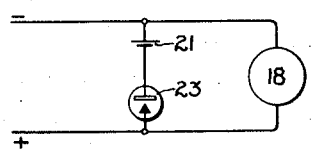
Figure 7:
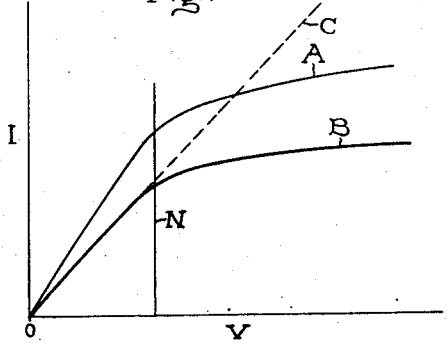

The features of my invention which are believed to be novel and patentable will be pointed out in the claim appended hereto. For a better understanding of my invention, reference is made in the following description to the accompanying drawing, in which Fig. 1 represents my invention applied to the detecting instrument of a null bridge measuring system. Figs. 2 and 3, respectively, show the character of scale calibrations for an instrument before and after applying my invention thereto. Fig. 4 represents the invention where the sensitivity of the protective shunt may be adjusted. Fig. 5 shows a modification of the invention. Fig. 6 represents an arrangement of the invention suitable only for direct current circuits, and Fig. 7 shows current voltage curves explanatory of the invention.

Referring to Fig. 1, I have indicated at 10 what may be assumed to be a high frequency alternating current measurement bridge, the details of which are immaterial and are not indicated. The bridge is shown as supplied from a high frequency source represented at 11 and it is assumed that the bridge is used in some measuring scheme so as to obtain zero voltage across the detecting terminals 12 when the bridge is finally balanced in a measuring operation. This is referred to generally as a null method because in the operation of the bridge to obtain a balance the detecting instrument which is usually connected across the detecting terminals 12 comes to a zero indication when a balance is obtained and the actual measurement reading is otherwise obtained as, for example, by the position of an adjustable device in one arm of the bridge. My invention is particularly beneficial for protecting the detecting instrument of such a bridge because in the initial stages of obtaining a bridge balance the voltage across terminals 12 may be considerable, whereas the instrument used should be one sensitive to very low voltages.

In Fig. 1 the detecting instrument is represented at 13 and the protective arrangement of my invention comprises a battery 14 connected across the detecting terminals 12 in shunt to instrument 13 through rectifiers 15 so arranged with respect to the polarity of battery 14 that the battery cannot discharge through these rectifiers but may be charged by full wave rectification in case the voltage across the detecting terminals 12, when rectified, is high enough to overcome the counter E. M. F. of the battery. The detecting instrument 13 is represented as of the direct current rectifier type and is connected to the detecting terminals 12 through a filter indicated at 16. The instrument 13 may be considered to be a sensitive voltmeter or millivoltmeter which without my protective scheme applied to the circuit would have substantially a linear scale calibration such as is represented in Fig. 2, the instrument being calibrated with the filter to represent a voltage proportional to that across the detecting terminals 12. Such an unprotected arrangement is sensitive but if, as is likely to happen in the initial stages of a bridge measuring operation, a voltage corresponding to several times the normal full scale range of the detecting instrument should appear across terminals 12 instrument 13 would likely be seriously damaged.

With my protective scheme connected across the detecting circuit as represented the instrument 13 may then be recalibrated as represented in Fig. 3.

Up to about five volt units the instrument 13 is just as sensitive as before so that it has the desirable characteristics necessary for accurately balancing the bridge 10. However, for higher voltages current now begins to flow into battery 14 through the rectifiers 15 so that the range of instrument 13 is not reached until fifty-five volt units appear across terminals 12 yet instrument 13 indicates and guides the operator in balancing of the bridge and as a balance is approached and the voltage across terminals 12 approaches zero the protective device becomes inactive and the instrument 13 again operates over the more sensitive portion of its calibration range. The voltage of the battery will be so proportioned with the voltage drop through the filter and other conditions of the circuit as to produce the results desired. Preferably the battery will have a current capacity sufficiently large as compared to the small current that flows in the detector circuit that its counter E. M. F. will remain substantially constant after considerable use. However, it may be noted that a change in instrument calibration due to any expected rise in battery voltage is immaterial in any measuring system in which the detecting instrument reads zero at the time of measurement.

Fig. 4 shows the protective scheme between an alternating current source 17 and an instrument or other electrical device 18 where an adjustable potential divider 19 is connected across the battery of the biased rectifier protective device. By adjustment of the potential divider the voltage of source 17 at which the protective device starts to become effective may be varied. Also the potential divider resistance allows the battery 14 to discharge slowly with low voltages of source 17 thereby tending to maintain the battery voltage substantially constant and the system in calibration with alternate high and low voltages of source 17.

Substantially the same results of the rectifier bridge of Fig. 1 may be obtained with two batteries 20 and 21 connected in series with rectifiers 22 and 23 across the circuit of the device 18 to be protected as represented in Fig. 5. Battery 20 and rectifier 22 are connected in reverse to battery 21 and rectifier 23 in shunt to the device 18. The rectifiers and batteries are, of course, connected as in the other arrangements so that the batteries will not discharge through the rectifiers but may be charged when their counter E. M. F. is exceeded. An adjustable impedance 24 may be used in series with device 18 to assist in calibration or to change the calibration as desired. While the arrangements of Figs. 4 and 5 may be used with either direct or alternating current circuits it is unnecessary to use a full wave rectifier arrangement with direct current and for direct current circuits where the polarity does not change the biased rectifier may be simplified as represented in Fig. 6.

The effect of changing the impedance 24 of Fig. 5 is represented in the curves of Fig. 7 where the voltage of source 17 represented by V is plotted against the current I in the device 18. For a given value of impedance at 24 the current through the device 18 and consequently its deflection characteristics, if it be an indicating instrument, may be represented by curve A. At a voltage corresponding to the value N the protective scheme comes into operation. If the impedance at 24 be increased the current through device 18 will be less as represented by the curve B. Without the protection the current in device 18 would increase as per dotted line curve C with an increase in voltage.

It is seen that I have provided a simple, easily adjustable way of protecting electrical devices against overvoltages but without the necessity of cutting such devices out of service or interfering with their operation when the protective feature comes into operation.

What I claim as new and desire to secure by Letters Patent of the United States is:

A voltage protective system comprising in combination a measurement bridge having terminals across which a voltage proportional to the condition of unbalance of said bridge appears when the bridge is in use, a sensitive electrical instrument subject to such voltage to guide in balancing the bridge, and means including a rectifier and a storage battery in series relation connected in shunt relation to said terminals such that the battery cannot discharge through the rectifier but may be charged therethrough, the battery having a counter E. M. F. such as to prevent charging when the bridge is substantially balanced and the voltage applied to said instrument is low but such as to cause charging when the bridge is appreciably unbalanced and the voltage across said terminals tends to be in excess of that which it is desirable to apply to the instrument.

HENRY W. BOUSMAN.